United States Patent [19]

Ban et al.

[11] 4,391,161
[45] Jul. 5, 1983

[54] CONNECTING ROD OF INTERNAL COMBUSTION ENGINE

[75] Inventors: Keisuke Ban, Fujimi; Takeo Arai, Higashimatsuyama, both of Japan

[73] Assignee: Honda Giken Kogyo Kabushiki Kaisha, Tokyo, Japan

[21] Appl. No.: 181,227

[22] Filed: Aug. 25, 1980

[30] Foreign Application Priority Data

Aug. 29, 1979 [JP] Japan .................................. 54-109854

[51] Int. Cl.³ ............................................. G05G 1/00
[52] U.S. Cl. .................................................. 74/579 E
[58] Field of Search ......................... 74/579 R, 579 E

[56] References Cited

FOREIGN PATENT DOCUMENTS 535457 1/1957 Canada .............................. 74/579 E
599722 11/1959 Italy .................................. 74/579 E
218099 7/1924 United Kingdom .............. 74/579 E Primary Examiner—Kenneth Dorner
Attorney, Agent, or Firm—Armstrong, Nikaido, Marmelstein & Kubovcik

[57] ABSTRACT

A connecting rod of an internal combustion engine, formed from a light alloy such as aluminum, has a rod portion which is selectively and locally reinforced with bundle of inorganic fibers such as stainless steel fibers. The fiber-reinforced part of the connecting rod is suitably selected in accordance with the shape and function of the connecting rod. Assuming that the axis parallel to the axis of piston pin is represented by Y and the axis orthogonal to the axis Y by X, the second moment of inertia around the Y axis is smaller than that around the X axis at any cross-section of the rod portion. At the same time, in the fiber-concentrated part of the rod portion, the second moment of inertia around the Y-axis is selected to be equal to or greater than that around the X axis.

3 Claims, 2 Drawing Figures

CONNECTING ROD OF INTERNAL COMBUSTION ENGINE

BACKGROUND OF THE INVENTION

1. Field of the Invention

The present invention relates to a connecting rod of an internal combustion engine and, more particularly, to a connecting rod made of a light alloy.

2. Description of the Prior Art

In general, the mechanical strength and shape of the connecting rod of an internal combustion engine are required to meet various requirements in order to sustain buckling and bending forces.

As to the buckling of the connecting rod, the following relationship exists between the strength and the shape of the connecting rod.

$$P_{y,x} = \frac{A \cdot \sigma_{y,x}}{1 + a_o \left(\frac{l}{i_{y,x}}\right)^2}, \quad i_{y,x} = \sqrt{\frac{I_{y,x}}{A}}$$

where, X and Y are orthogonal axes. More specifically, in the cross-section of the rod portion of the connecting rod, the Y axis extends in the direction parallel to the axis of the piston pin, while the X axis extends at a right angle to the Y axis. Symbols Py and Px represent the buckling load in the Y axis (rotational direction) and the buckling load in the X axis (axial direction). A symbol A represents the critical cross-sectional area of the rod portion. The symbol $\sigma_{y,x}$ represents the tensile strength in case of a homogeneous material, while a symbol $a_o$ represents a constant. The distance between two axes of small and big ends of the connecting rod is shown at a symbol l. Symbols Iy and Ix designate, respectively, the second moment of inertia in Y axis (rotational direction) and second moment of inertia in X axis.

There also is a relationship expressed by the following equation (1) in which K represents the allowable limit of buckling.

$$P_y \geq P_x > K \tag{1}$$

From the equation (1) above, derived is the following equation (2).

$$\sigma_y I_y \geq \sigma_x I_x \tag{2}$$

In case of a homogeneous material, since $\sigma y$ and $\sigma x$ are equal to each other, the equation (2) is transformed into the following equation (3).

$$I_y \geq I_x \tag{3}$$

Thus, the rotary side of a connecting rod is supported materially in the same manner as the free support and tends to buckle easily as compared with the axial side. In addition, the rotary side of the connecting rod is subjected to oscillating bending force. For these resons, it is a common measure to determine that the second moment of inertia be made greater at the rotary side (Y axis) than at the axial side (X axis).

Under these circumstances, it has been recommended to make the rod portion of the connecting rod have an H-shaped cross-section. In such a case, in order to increase the second moment of inertia Iy in the Y axis, it is necessary to locate the mass at as large distance as possible from the Y axis, which in turn increases the size of the connecting rod in X axis. Particularly, in the connecting rod made of a light alloy, it is necessary to select the Iy and Ix having considerably large values, not to mention of the relation of $Iy \geq Ix$. In consequence, the size of the connecting rod is X axis is further increased.

The increased size of the connecting rod made of a light metal inevitably widens the locus of the rotation of the connecting rod, resulting in an interference with the cylinder sleeve and with the cylinder block, posing a serious problem concerning the space utilization. This problem is serious particularly in the long stroke engines. Thus, for accommodating a connecting rod made of a light alloy having a sufficient mechanical strength in a space which has been designed for a conventional connecting rod made of a steel, modifications and changes of design are necessary for various parts of the engine. These modifications and changes are materially impossible. Even if the engine as a whole is designed newly for the use of the connecting rod made of a light alloy, there is necessary a large space of the cylinder block. At the same time, there is a restriction to the length of the cylinder. In consequence, the projection length of the piston from the lower part of the cylinder is increased inevitably resulting in an unstabilized piston behaviour. This is unacceptable particularly in the long stroke type engines.

On the other hand, there is an increasing demand for reduced weight and fuel consumption of internal combustion engines, which in turn requires to achieve the reduction of weight of the reciprocating masses in the engine. This gives rise to a demand for the reduction of weight of the connecting rod. Thus, the above stated problems have to be overcome soon, in order to achieve the reduction of weight of the connecting rod.

SUMMARY OF THE INVENTION

Under these circumstances, the present invention aims at providing a connecting rod made of a light alloy which can be mounted substantially in the same space as that for the conventional connecting rod made of a steel, while preserving a sufficient mechanical strength as a connecting rod.

Another object of the invention is to provide a connecting rod made of a light alloy, in which the mechanical strength is given preferentially only to the portion requiring the strength and the portion where the increase of the mechanical strength is specifically effective, in accordance with the result of analysis of the function and characteristics of the mechanical parts.

The above and other objects, features and advantages of the invention will become apparent from the following description of the invention when taken in conjunction with the accompanying drawings which illustrate a presently preferred embodiment of the invention.

DESCRIPTION OF THE PREFERRED EMBODIMENTS

Figure 1:
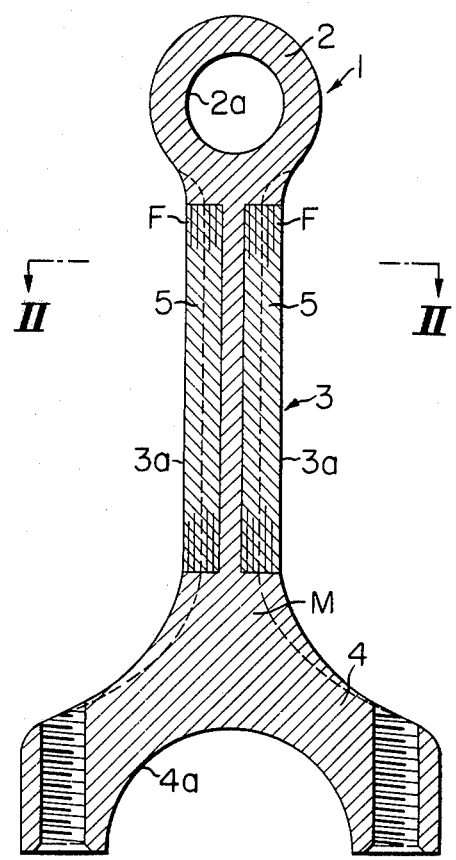
FIG. 1 is a vertical sectional view of a connecting rod constructed in accordance with an embodiment of the invention.

Preferred embodiments of the invention will be described hereinunder with reference to FIGS. 1 and 2.

A connecting rod 1 of an internal combustion engine has a small end 2 provided with a through bore 2a for receiving a piston pin, a rod portion 3 and a big end 4 provided with a semi-circular recess 4a at which it is connected to a crank shaft. At both sides of the rod portion 3, are longitudinal stiffening ribs 3a *constituted by two parallel bundles* 5 of inorganic fibers which are integrated with the matrix metal M to form a composite material with the latter thereby to form a fiber-reinforced part F.

The inorganic fiber is required to have a high unidirectional resiliency and high strength. For instance, metallic fibers such as stainless steel fibers, carbon fibers, assembled fibers of tora, yarn or whiskers of a ceramic fiber such as silicon carbide fiber and so forth can be used as the inorganic fibers reinforcing the connecting rod. These fibers are pre-shaped into a form of bundle 5 to facilitate handling.

In order to reduce the weight of connecting rod, as well as to save the labour, light alloys such as aluminum, magnesium and the like are used as the matrix metal.

A discussion will be made hereinunder as to the strength of the connecting rod having the described construction.

Figure 2:
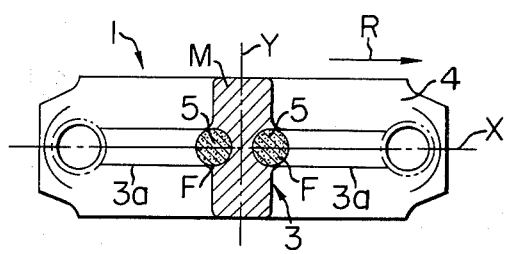
FIG. 2 is a sectional view taken along the line II—II of FIG. 1.

Referring to FIG. 2, the axis parallel to the axis of the piston pin (not shown) is represented by Y, while the axis orthogonal to the Y axis is represented by X. The direction of rotation of the connecting rod is represented by an arrow R.

In the connecting rod 1 of the invention, the fiber-concentrated part F and the portion M constituted solely by the matrix metal M exhibit different mechanical properties. Thus, the second moments of inertia in Y and X directions at the fiber-concentrated part F are shown by $I_{(c)y}$ and $I_{(c)x}$, while those at the matrix metal portion M are shown by $I_{(m)y}$ and $I_{(m)x}$, respectively. Also, the tensile strengths of the fiber-concentrated part F and the matrix metal portion M are represented by $\sigma_c$ and $\sigma_m$, respectively.

From the equation (2), the second moment of inertia $I_y$ and Y axis of the total cross-section is determined as follows.

$$I_y = I_{(c)y} + I_{(m)y}$$

Also, the second moment of inertia $I_x$ in X axis of the total cross-section is given as follows.

$$I_x = I_{(c)x} + I_{(m)x}$$

Since the total cross-section of the rod portion is regarded as having a substantially rectangular form elongated in the direction of Y axis, a relation of $I_y < I_x$ is naturally derived.

Also, the following relationships are established.

$$\sigma_y \cdot I_y = \sigma_c \cdot I_{(c)y} + \sigma_m \cdot I_{(m)y}$$

$$\sigma_x \cdot I_x = \sigma_c \cdot I_{(c)x} + \sigma_m \cdot I_{(m)x}$$

The tensile strength $\sigma_c$ of the fiber-reinforced part F is much greater than that $\sigma_m$ of the matrix metal portion M ($\sigma_c > \sigma_m$). In addition, since the cross-section of the fiber-concentrated part F is regarded as being materially rectangular, a relationship of $I_{(c)y} \geq I_{(c)x}$ is naturally derived from the relation of length in the Y and X directions.

From the above-explained relation, derived is the following condition:

$$\sigma_y \cdot I_y \geq \sigma_x \cdot I_x$$

and, hence, the following relation.

$$p_y \geq p_x$$

This relation of $p_y \geq p_x$ corresponds to the aforementioned equation (1).

Thus, since the second moments of inertia $I_{(c)y}$ and $I_{(c)x}$ in the fiber-concentrated part are selected to satisfy the relation of $I_{(c)y} \geq I_{(c)x}$ at the cross-section of $I_y < I_x$, buckling strengths $P_x$ and $p_y$ are obtained which well compare with those of the steel connecting rod designed to meet the condition of $I_y \geq I_x$.

The mechanical strength of the rod portion can be further improved by suitably selecting the ratio of the cross-sectional area of the fibers to the cross-sectional area of the fiber-concentrated portion. The range of this ratio, however, is determined by the limit value of effective concentration of the fibers at the aimed portion to achieve the increase of strength in that portion.

If the above-mentioned ratio of cross-sectional area is smaller than 25%, it is not possible to correctly position and hold the fiber, bundles, during pressure application and filling, as well as solidification of the matrix by high-pressure solidification casting. In addition, the rate of reinforcement itself is undesirably low and does not fulfil the intended purpose.

The the contrary, a cross-sectional area ratio exceeding 80% causes a too high density of the fibers, so that an internal flaw is liable to be generated during pressurizing, filling and solidification by the high-pressure solidification casting possibly to deterioriate the effect of the reinforcement.

The optimum ratio of the cross-sectional area of the fibers to the total cross-section of the critical portion to be reinforced is determined by the rate of reinforcement based on the law of composition of the fiber reinforcement and the volume of the matrix. It is not possible to obtain a sufficiently high reinforcing effect if the above-mentioned ratio is 10% or less. To the contrary, when the above-mentioned ratio exceeds 40%, the ratio of the volume of the fibers to the volume of the matrix is too high so that the filling and integration of the matrix with the fibers are rendered difficult to lose the reinforcement effect.

The optimum ratio of cross-sectional area of the fiber concentrated portion to that of fibers, capable of providing the highest reinforcement efficiency, varies depending on various factors such as diameter of the fibers used, thermal capacity of the fibers, wettability thereof relative to the matrix and so forth. It is true that there is a certain room for the improvement of the matrix volume, e.g. by changing the casting method, casting condition, feeder head of the molten matrix and so forth. Such an improvement, however, is often accompanied by disadvantages in the productivity.

Therefore, according to the invention, the number of fibers, density of fibers and the shape of the fiber bundle before the integration with the matrix are suitably selected in accordance with the shape of the critical cross-section of the member to be reinforced, such that the ratio of cross-sectional area of the fibers to that of the fiber concentrated portion preferably falls within the range of between 25 and 80%, and the total number of the fibers or the number of the fiber bundles is so selected that the ratio of cross sectional area of the fibers to the total cross sectional area of the critical portion preferably falls within the range of between 10 and 40%.

Practical examples of production of the connecting rod will be described hereinunder.

EXAMPLE I

Two fiber bundles of 7 mm in diameter and 240 mm in length were formed, each from 91,000 stainless steel wires having a fiber diameter of $25\mu$ and a fiber strength of 180 Kg/mm$^2$. These fibers were placed in a mold (not shown) for casting a connecting rod of an internal combustion engine, such that these bundles occupy the positions of central ribs on both sides of the rod portion of the connecting rod. Then, using an aluminum alloy (JIS AC4D) as the matrix metal, a connecting rod was formed by a high-pressure solidification method to have a fiber-reinforced central rib portion as shown in FIG. 2.

The connecting rod thus produced had a critical cross-sectional area A of 228 mm$^2$ at the rod portion, second moment of inertia $I_x$ around X axis of 7860 mm$^4$, second moment of inertia $I_y$ around the Y axis of 2400 mm$^4$ and a distance l of 127.4 mm between axes of small and big ends. The composite ratio of the total cross-section is 20% by volume (64.2 Kg/mm$^2$ at room temperature, 55.4 Kg/mm$^2$ at 200° C.). As to the matrix, the specification was 36 Kg/mm$^2$ at room temperature and 25 Kg/mm$^2$ at 200° C.

The following table shows the buckling loads Px and Py of the above stated connecting rod, in comparison with those of the conventional connecting rod made of a homogeneous light alloy.

| temp. °C. | conventional connecting rod r'm temp 200° C. | | theoretical value of connecting rod of invention r'm temp 200° C. | | actually measured value of connecting rod of invention r'm temp 200° C. | |
|---|---|---|---|---|---|---|
| Px Kg | 7,600 | 5,300 | 7,500 | 5,300 | 8,500 | 7,000 |
| Py | 6,400 | 4,500 | 11,500 | 10,000 | 14,000 | 13,500 |
| remarks | composed solely of AC4D no reinforcement fiber used | | Composite strength in Y-axis direction. Matrix strength in X-axis direction | | | |

As will be clear from the above table, the buckling stress $P_y$ in the Y-axis direction (rotational direction) is greater than the theoretical strength of total cross-section at the critical section. This tells that the second moment of inertia at the fiber-concentrated part of the connecting rod greatly contributes to the improvement of the strength of the connecting rod.

EXAMPLE II

A bundle of fibers of 240 mm long and having a rectangular cross-section of 76 mm$^2$ ($8 \times 9.5$ mm) was formed from 98,000 stainless steel fibers having a fiber diameter of $25\mu$, tensile strength of 150 Kg/mm$^2$ and modulus of 1900 Kg/mm$^2$. The total cross-sectional area of fibers and the total weight of the same were 48.1 mm$^2$ and 45 g, respectively. This bundle was placed in the mold for casting a connecting rod of an internal combustion engine over the portion corresponding to the rod portion and the small end of the connecting rod. Then, a connecting rod of an internal combustion engine is produced by a high-pressure solidification casting method, in which the central part of the connecting rod (critical cross-section 233 mm$^2$) and the small end portion are reinforced by the fibers, using JIS AC8B as the matrix metal.

EXAMPLE III

Two fiber bundles of 5 mm in diameter and 240 mm long were formed of the same stainless steel fibers as those used in the Example II. A connecting rod of an internal combustion engine having four rib portions (critical area 233 mm$^2$) formed at both sides of the rod portion are concentrically reinforced with the fiber bundles.

EXAMPLE IV

A fiber bundle of 7 mm in diameter and 240 mm long was formed of the stainless steel fibers same as those used in the Example II. The both central rib portions of rod portion (critical area 204 mm$^2$) of connecting rod for internal combustion engine were concentrically reinforced with this bundle of fibers, in the same way as the Example II.

EXAMPLE V

A connecting rod for internal combustion engine same as that of Example III was produced with the use of a fiber bundle of 5.5 mm in diameter and 240 mm in length, composed of silicon carbide fibers (total number 538,000, total weight 10 g, fiber diameter $8\mu$, tensile strength 295 Kg/mm$^2$, and a modulus 19,600 Kg/mm$^2$) in place of the aforementioned bundle of stainless steel fibers as used in Example III.

Specifications of fibers in the critical area, tensile strength theoretically calculated from the law of composition and the modulus of the connecting rod of the foregoing examples II–V are shown in the following table.

| | | | Specification and Strength in Accordance with Law of Composition at Critical Area of Rod Portion | | | | | | |
|---|---|---|---|---|---|---|---|---|---|
| example | fiber weight (g) | number of fibers | total fiber cross-sectional area (A)/ total cross-sectional area (B) of critical portion | ratio of (A)/(B) % | shape of area of fiber concentration | total fiber cross-sectional area (A)/ sectional area (C) of fiber-concentrated portion | ratio of (A)/(C) % | strength according to law of composition tensile (Kg/mm$^2$) | modulus (Kg/mm$^2$) |
| II | 45 | 98000 | 48.1/233 | 20.7 | 8 × 9.5 | 48.1/76 | 63 | 54.8 | 9640 |

-continued

Specification and Strength in Accordance with Law of Composition at Critical Area of Rod Portion

| example | fiber weight (g) | number of fibers | total fiber cross-sectional area (A)/ total cross-sectional area (B) of critical portion | ratio of (A)/(B) % | shape of area of fiber concentration | total fiber cross-sectional area (A)/ sectional area (C) of fiber-concentrated portion | ratio of (A)/(C) % | strength according to law of composition tensile (Kg/mm²) | modulus (Kg/mm²) |
|---|---|---|---|---|---|---|---|---|---|
| III | 45 | 98000 | 48.1/233 | 20.7 | 50 × 4 | 48.1/78.5 | 61 | 54.8 | 9640 |
| IV | 45 | 98000 | 48.1/204 | 23.6 | 70 × 2 | 48.1/77 | 62.5 | 58.3 | 9980 |
| V | 10 | 538000 | 29.9/204 | 14.7 | 5.50 × 2 | 29.9/47.5 | 62.9 | 69.0 | 9020 |

A tensile strength test was conducted with connecting rods of internal combustion engine of above examples II to V. The test results showned that the static tensile strength conforms with the strength determined theoretically in accordance with the law of composition, and no substantial difference due to position of reinforcement was observed.

The following results were obtained in a dynamic test. Namely, in the example II, stress concentration was observed at the both side rib portions, depending on the cross-sectional shape of the rod portion when the small and big ends were subjected to a dynamic load. Therefore, an initial fatigue was generated in these rib portions and then transmitted to the composite portion where the fibers are concentrated, and the further propagation of the fatigue is stopped. However, since a bending is generated in this state at the rod portion, a propagation of bending stress in the fiber longitudinal direction is caused at the composite portion so that a rupture takes place at once when the propagation has come out of the composite portion. Therefore, in example II, no substantial effect of prevention of initial fatigue was observed, although the rupture due to fatigue was effectively avoided.

In the example III in which, upon recognition of the result of test conducted with the example II, the side rib portions of large stress concentration are concentrically reinforced with fibers, the generation and propagation of the fatigue in both rib portions were largely retarded and a remarkable improvement in the fatigue strength was observed.

This tells that a drastic reinforcement effect is obtainable by selecting the optimum position of reinforcement taking into consideration the shape of the member to be reinforced.

In consequence, a further improvement of strength was achieved by constructing the rod portion of the connecting rod to have stiffening ribs at its both side portions and concentrically reinforcing these rib portions with fibers, as in the example IV.

Thus, according to the invention, the connecting rod is suitably and effectively reinforced with fibers taking into consideration the stress distribution which is determined by the shape of the connecting rod, in contrast to the conventional connecting rod in which the reinforcing alloy and/or fibers are distributed uniformly or homogeneously. At the same time, it becomes possible to select the shape of the connecting rod suitable for the reinforcement with fibers, without sticking to the shape of the conventional connecting rod.

As has been described, according to the invention, it is possible to adopt cross-sectional shapes and design methods entirely different from those of the conventional connecting rod of homogeneous light alloy by taking into account the second moment of inertia in the fiber-reinforced part, which exhibits strength and modulus entirely different from the matrix metal portion of the connecting rod, and by suitably selecting the directionality of the second moment of inertia. Therefore, in the connecting rod of the invention, the second moment of inertia $I_y$ in the direction of rotation, can be sufficiently diminished as compared with that $I_x$ in the axial direction. Thus, it is possible to obtain a small locus of movement of the connecting rod substantially equivalent to that of the conventional connecting rod to avoid problems such as interference with the cylinder sleeve, cylinder block and so forth to eliminate the serious problems concerning the space.

Also, the invention is applicable to the conventional connecting rod having the relation of $I_y > I_x$. In this case, however, the advantage concerning the locus is not so remarkable or the setting of the fiber-reinforced part is too complicated. Such an application, therefore, is not recommended.

According to the invention, the production of the fiber-reinforced composite material by filling and integrating the matrix metal with inorganic fibers by a high-pressure solidification casting method is conducted such that the ratio of cross-sectional area of total fibers to the total area in any cross section of the fiber-reinforced rod portion falls within the range of between 10 and 40% and that the ratio of the cross-sectional area of fibers to the cross-sectional area in the porion of fiber concentration falls between 25 and 80%. Therefore, the production of the connecting rod is facilitated and simplified, because there is far less restriction on the filling and integration of the matrix metal with the reinforcement fibers as compared with the production of the conventional connecting rod in which the fibers are uniformly distributed over the entire portion of the connecting rods. In addition, it is possible to effectively reinforce the portions requiring the reinforcement with minimized use of reinforcement fibers, in accordance with the shape of the member to be reinforced, so that the product part can have a distinguished mechanical strength.

Furthermore, since the uniform distribution of the fibers is not necessitated, the handling of the fibers is much facilitated and, in addition, the efficiency of fiber filling and integration is improved and the number of steps of the production process is reduced, even when the matrix volume is limited due to the shape of the connecting rod, because a concentrated reinforcement with fibers at specific local portions is possible.

Also, the rate of concentration of fibers (number of fibers) as well as the volume percentage of the fibers to the matrix metal, can be widely selected to enable a reinforcement in accordance with the function and the performance of the member to be reinforced.

Since only the portion requiring the reinforcement is selectively reinforced, in contrast to the conventional connecting rod, it is possible to obtain a member having an overall balance, making the efficient use of the characteristics of the matrix metal. This means that the specific consideration to the direction of stress, which has been necessitated in the conventional connecting rod, is fairly eliminated and the generation of local weak point due to a specific arrangement of the fiber direction is completely avoided.

As has been described, according to the invention, it is possible to easily select and reinforce the portions of the mechanical part requiring the reinforcement, which affords an efficient design and reinforcement of these mechanical parts.

What is claimed is:

1. A connecting rod of an internal combustion engine including a rod portion having longitudinal stiffening rib portions, a longitudinal axis and two ends, a big end portion connected to one end of said rod portion and being adapted to be connected to a crankshaft of the engine, and a small end portion connected to the other end of said rod portion having a hole bored therethrough for receiving a piston pin having an axis; said rod portion having a Y-axis perpendicular to said longitudinal axis and parallel to said axis of said piston pin and an X-axis perpendicular to both said Y-axis and said longitudinal axis; said rod portion comprising at least one reinforced portion and a remaining portion; said remaining portion being made of a light alloy material, said at least one reinforced portion being made of a bundle of inorganic fibers extending along said longitudinal axis formed into a metal matrix impregnated with said light alloy material; said fibers having a cross-sectional area; said rod portion having a cross-sectional area, a cross-sectional shape, a Y-axis second moment of inertia, and an X-axis second moment of inertia; said at least one reinforced portion having a cross-sectional area and a Y-axis second moment of inertia; said cross-sectional shape of said rod portion taken perpendicular to said longitudinal axis being such that said Y-axis second moment of inertia of said rod portion is smaller than said X-axis second moment of inertia of said rod portion; and said reinforced portion being positioned and sized in said rod portion such that said Y-axis second moment of inertia of said reinforced portion is equal to or greater than said X-axis second moment of inertia of said reinforced portion.

2. A connecting rod of an internal combustion engine as claimed in claim 1, wherein the ratio of cross-sectional area of said fibers to the total area in any cross-section of said rod portion is selected to fall between 10% and 40% and wherein the ratio of the cross-sectional area of fibers to the cross-sectional area of said at least one reinforced portion is selected to fall between 25% and 80%.

3. A connecting rod of an internal combustion engine as claimed in claim 1 or 2, wherein said stiffening rib portions of said rod portion are each concentrically reinforced with a bundle of inorganic fibers.

* * * * *